United States Patent [19]

Costin

[11] Patent Number: 5,607,036
[45] Date of Patent: Mar. 4, 1997

[54] ONE-WAY CLUTCH WITH STRETCHABLE SPRING MEMBER

[75] Inventor: Daniel P. Costin, Naperville, Ill.

[73] Assignee: Borg-Warner Automotive, Inc., Sterling Heights,, Mich.

[21] Appl. No.: 398,283

[22] Filed: Mar. 3, 1995

[51] Int. Cl.$^6$ ................................................ F16D 41/07
[52] U.S. Cl. ............................... 192/45.1; 192/41 A
[58] Field of Search ......................... 192/45.1, 41 A; 188/82.8; 267/163, 181

[56] References Cited

U.S. PATENT DOCUMENTS

| 2,555,484 | 6/1951 | Gruenberg et al. | 192/45.1 |
|---|---|---|---|
| 2,624,436 | 1/1953 | Gamble | 192/45.1 |
| 2,753,027 | 7/1956 | Troendly et al. . | |
| 2,793,729 | 5/1957 | Cobb | 192/45.1 |
| 2,812,839 | 11/1957 | Cobb | 192/45.1 |
| 2,824,635 | 2/1958 | Troendly et al. . | |
| 2,824,636 | 2/1958 | Troendly et al. . | |
| 3,207,278 | 9/1965 | Titt | 192/45.1 |
| 3,324,980 | 6/1967 | Rojic et al. . | |
| 4,373,620 | 2/1983 | Zlotek | 192/45.1 X |
| 4,867,292 | 9/1989 | Hartig . | |
| 4,880,093 | 11/1989 | Message . | |
| 4,998,605 | 3/1991 | Ferris . | |
| 5,291,978 | 3/1994 | Numata . | |
| 5,335,761 | 8/1994 | Leitz . | |
| 5,445,255 | 8/1995 | Rutke et al. | 192/45.1 |

FOREIGN PATENT DOCUMENTS

1157037  11/1963  Germany ........................ 192/45.1

Primary Examiner—Rodney H. Bonck
Attorney, Agent, or Firm—Brooks & Kushamn; Greg Dziegielewski

[57] ABSTRACT

A one-way clutch mechanism having tiltable sprags disposed between concentric races for controlling torque delivery is disclosed. The clutch mechanism includes an annular resilient stretchable spring member and either an inner cage member or an outer cage member. The cage member and spring member provide full phasing of the sprags. Enlarged sprag members can be utilized to increase the wedging and torque capacity of the clutch mechanism. The windows of the spring member can have one or more tabs, as desired, but preferably are tabless. In an alternative embodiment, the clutch mechanism has only a resilient, stretchable spring member to control and bias the sprags between the races.

37 Claims, 4 Drawing Sheets

ONE-WAY CLUTCH WITH STRETCHABLE SPRING MEMBER

TECHNICAL FIELD

The present invention relates to one-way clutches having tiltable sprags disposed between concentric races for controlling torque delivery in a torque flowpath between a driving member and a driven member.

BACKGROUND ART

One-way clutches having tiltable sprags disposed between concentric rotatable members for controlling torque delivery are known. The concentric rotatable members, typically called inner and outer race members, are selectively coupled and uncoupled by the sprags. The sprags are customarily arranged in an annular configuration having their opposite end portions in frictional engagement with the inner and outer races. The sprags serve to interlock the races or release the races as the sprags are tilted within the annular recess by rotation of the races. In this manner, the one-way clutch is automatically conditioned for driving or overrunning operation responsive to the direction of rotation of the races.

When torque is delivered to the clutch in one direction, the races freewheel and negligible torque is transferred. When the direction of torque delivery is reversed, the sprags tilt into wedging engagement with the races, substantially preventing relative rotation of the races, and accommodating torque transfer.

In order to assure smooth operation of the one-way clutch, the driving loads must be shared equally among the sprags. If a load is transferred through only a few of the sprags, a condition known as "rollover" can occur. In this situation, the driving torque may force one or more of the sprags over center resulting in failure or permanent deformation of either the sprags or the races.

Another condition to be avoided is known as "popout" or "popping" in which the loaded springs suddenly lose static contact with one of the race surfaces, resulting in rapid rotation of sprags to the extreme overrunning position. "Popouts" are caused by sudden release of the load, vibration, or low friction conditions. After "popout" has occurred, one or more of the sprags may fail to engage upon initiation of reverse rotation, due to impact damage.

In order to prevent rollover and reduce damage from popping, some one-way clutches include inner and outer cages in order to keep all of the sprags at substantially the same angular position. These clutches are said to be fully phased.

One-way clutch mechanisms with tiltable sprags have been designed having various race, cage and spring configurations in attempts to provide improved clutch systems. For example, in U.S. Pat. No. 3,324,980 to Rojic et al., the sprags are positioned for engagement by a single elastomer cage with energizing fingers. Since the energizing fingers alone contact the sprags, phasing of the sprags is not achieved. Other patents in which the sprags are free to rotate independently and are not phased are shown, for example, in U.S. Pat. No. 2,753,027 to Troendly et al., U.S. Pat. No. 2,824,635 to Troendly et al., and U.S. Pat. No. 4,880,093 to Message. In the devices shown in these three patents, a single metal cage is used to separate the sprags and a metal ribbon spring is positioned in close proximity to the cage in order to tilt and bias the sprags.

Other single cage one-way clutches are shown in U.S. Pat. No. 4,867,292 to Hartig and U.S. Pat. No. 5,335,761 to Leitz. The Hartig patent discloses a clutch with a single cage with independent energizing springs for each sprag. These independent springs do not provide phasing of the sprags. In Leitz, the clutch has a plastic single cage and a metal ribbon spring placed radially outwardly of the cage. Although phasing of the sprags is secured by Leitz, the metal ribbon spring is relatively fragile affecting the durability of the clutch.

A double plastic cage clutch mechanism is shown in U.S. Pat. No. 4,998,605 to Ferris. This clutch has a plastic inner cage and a plastic outer cage with energizing fingers on one of the cages. Although the two cages act to provide phasing of the sprags, the structure is difficult to manufacture and utilizes a large amount of material. Also, the plastic material is not very durable when used as a spring. Further, the outer wedging surfaces of the sprags are limited in size to fit inside the outer cage windows and thus may have a smaller wedging surface decreasing the torque capacity of the clutch.

Another double-cage clutch design is shown in U.S. Pat. No. 2,824,636 to Troendly et al. This patent discloses a highly successful double-cage sprag clutch in which the sprags are fully phased by the inner and outer cages. The cages are made of metal with specifically defined windows and a ribbon spring is positioned between the two cages for biasing the sprags.

SUMMARY OF THE INVENTION

It is an object of the present invention to provide an improved one-way clutch with tiltable sprags for controlling torque delivery in a torque flowpath between a driving member and a driven member. It is also an object of the present invention to provide a clutch mechanism with a single cage which is an improvement over known single cage one-way clutches.

It is another object of the present invention to provide a one-way clutch which has full phasing between the sprags and which is less expensive and easier to manufacture than known double cage one-way clutches with full phasing. It is still another object of the present invention to provide a one-way clutch which does not use independent energizing springs and which has a spring mechanism which is more durable than known metal ribbon springs.

It is a still further object of the present invention to provide a one-way clutch mechanism which has a thin annular spring made from a stretchable material, which utilizes a minimum amount of material between the races, has a full complement of wedging surfaces for delivering torque to the races, and which is easier to manufacture and assemble these known clutch mechanisms.

The present invention provides a one-way clutch mechanism with tiltable sprags which overcomes the problems with known clutch mechanisms and which meets the objects, purposes and advantages as set forth above. In accordance with the present invention, a one-way clutch mechanism is provided which has a single cage member positioned within the inner and outer races and a stretchable flexible spring member positioned between the cage and one of the races. The spring member forms a continuous annular member between the races and has a plurality of spaced apart windows for positioning of the sprags. The spring member also is stretchable having an elastic elongation preferably on the order of at least 50% and preferably is made from an elastomeric material.

The windows in the spring member can have one or more tabs, or be tabless. The spring member also is thin, that is, it has a thickness less than 50% of the height of the sprags. The spring member can be manufactured as a molded one-piece member or as an elongated ribbon bonded together to form an annular member. The spring member also can be positioned between an inner cage and the outer race, or can be positioned between an outer cage and the inner race.

In an alternate embodiment, particularly for low cost and low performance applications, the stretchable spring member can be positioned by itself between the inner and outer race members, i.e. without any accompanying cage members.

The present invention provides a single-cage sprag clutch mechanism with full phasing and good durability which are not present in known single-cage sprag clutch mechanisms. Also, the present invention is an improvement over double-cage sprag clutch mechanisms with full phasing due to its mechanical simplicity, high torque capacity, and low cost.

The above and other benefits, features and advantages of the present invention will become apparent from the following description of the invention when viewed in accordance with the accompanying drawings and appended claims.

BEST MODE FOR CARRYING OUT THE INVENTION

Figure 1:
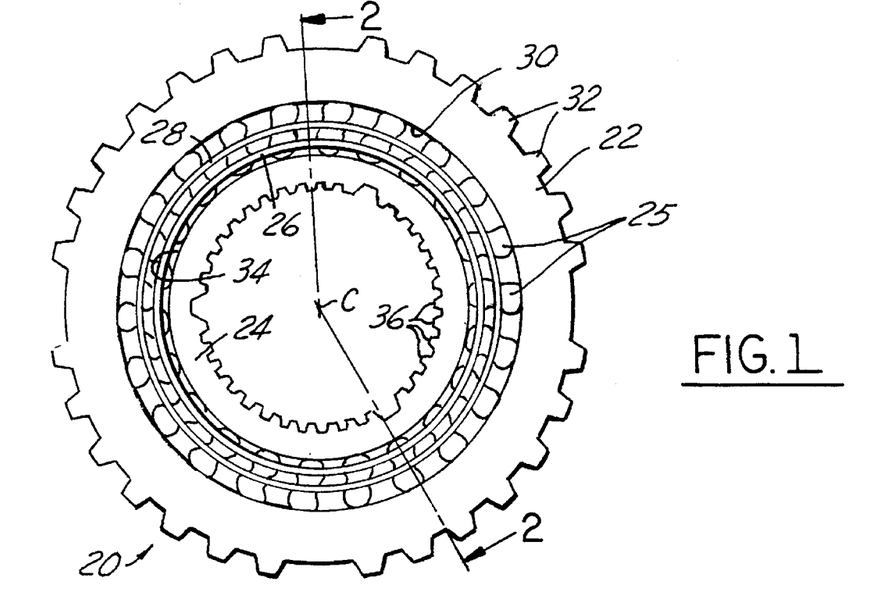
FIG. 1 illustrates a one-way clutch mechanism in accordance with the present invention.
Figure 2:
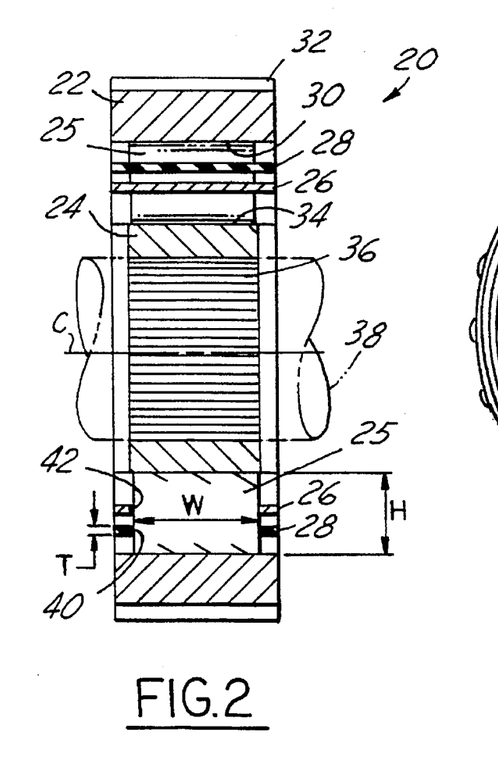
FIG. 2 is a cross-sectional view of the clutch mechanism in accordance with FIG. 1, the cross-section taken along lines 2—2 in FIG. 1.
Figure 3:
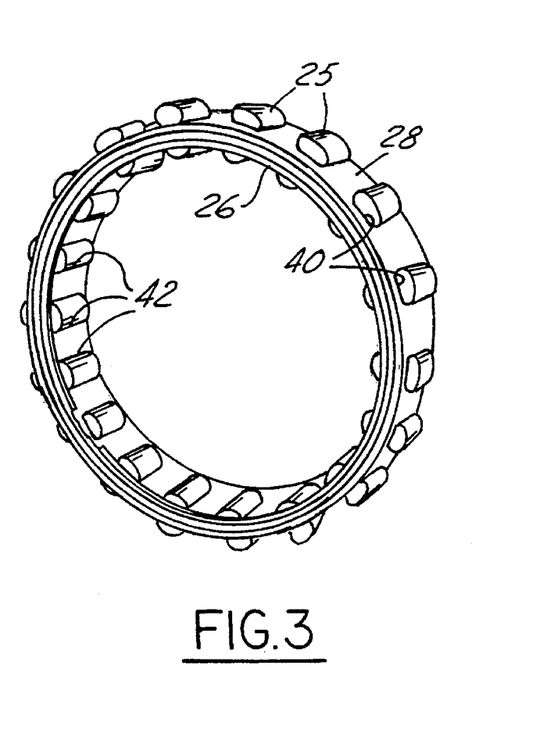
FIG. 3 is a perspective view of the sprags, cage and spring members of the present invention.

A clutch mechanism in accordance with the present invention is shown in FIGS. 1–3 and indicated generally by the reference numeral 20. The clutch mechanism includes an outer race or rotatable member 22 and a concentric inner race or rotatable member 24. The concentric races are centered around axis C. A plurality of sprags 25 are disposed in the annular space between the inner and outer races. An annular cage member 26 and annular spring member 28 are also positioned between the inner and outer races and act to hold the sprags in position.

The one-way clutch mechanisms in accordance with the present invention can be used in a wide variety of environments, as is well known to persons skilled in the art. In the environment shown in FIGS. 1 and 2, the clutch mechanism is adapted for use as part of a vehicle transmission. In this regard, the outer race 22 has an inner smooth cylindrical surface 30 and a plurality of spline teeth 32 on the external periphery or circumference. Similarly, the inner cage 24 has a smooth outer cylindrical surface 34 and an inner surface formed with a plurality of spline teeth 36. The inner race acts as a hub for the clutch and is mounted on a transmission shaft 38 shown in phantom in FIG. 2. Bearings (not shown) act to keep the cylindrical race surfaces substantially concentric.

The sprags 25 are generally bone-shaped clamping elements and are positioned through openings or windows 40 in the spring member 28 and openings or windows 42 in the cage member 26. The two ends of the sprags 25 are positioned in frictional contact with the cylindrical engaging surfaces 30 (on the outer race) and 34 (on the inner race).

Figure 4:
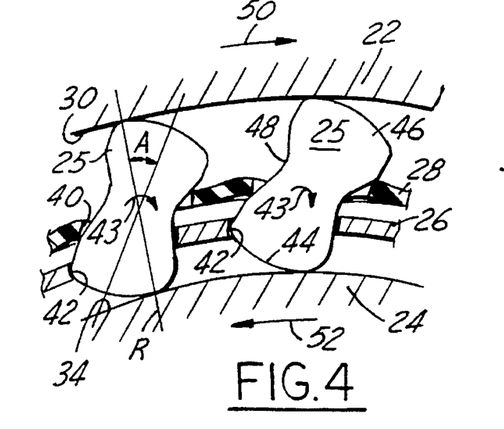
FIG. 4 is an enlarged view of sprag members in accordance with the present invention when the clutch mechanism is in the freewheeling condition.
Figure 5:
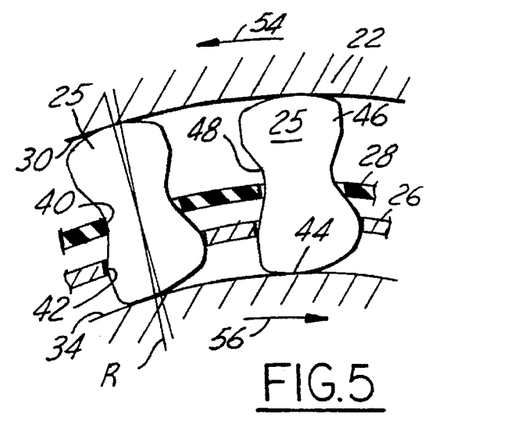
FIG. 5 is a view of the sprag members similar to that of FIG. 4, but with the clutch mechanism in the wedge or torque position.

The sprags 25 have inner and outer curved engaging surfaces 44 and 46, respectively, and a center narrowing waist area 48, as shown in FIGS. 4–5. The engaging curved surfaces 44,46 can have a variety of configurations or contours, depending on the desired application. In this regard, a preferred size and shape of the sprag members 25 is shown in U.S. Pat. No. 2,824,636, the disclosure which is hereby incorporated by reference herein. Other sprag members which can be used in accordance with the present invention are found, for example, in U.S. Pat. No. 5,335,761, the disclosure of which is also hereby incorporated by reference herein.

When the sprags are mounted in the annular space between the inner and outer races, they are tilted at an angle A from a radial line R passing through the sprag, as shown in FIG. 4. When the sprags 25 are tilted in a clockwise direction about their central portions due to movement of the races in the direction shown by arrows 50 and 52 (FIG. 4), the clutch is in a freewheeling condition. Upon a tilting of the sprags 25 in a counter-clockwise direction from the FIG. 4 position to that shown in FIG. 5, the ends of the sprags wedgingly engage between the two concentric races 22 and 24. As shown in FIG. 5, the outer race 22 and inner race 24 are rotated in the direction of the arrows 54 and 56, respectively. This connects the two races together in a torque transmitting relation.

Figure 6:
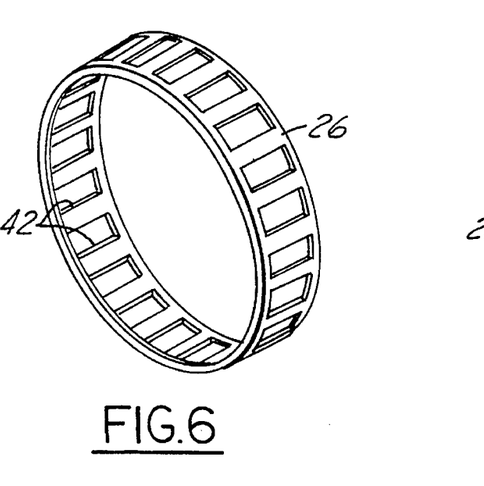
FIG. 6 is a perspective view of a cage member.

A cage member in accordance with the present invention is shown in FIG. 6. The cage member 26 is made from a thin piece of metal material, such as steel, and stamped or otherwise machine formed in the shape and configuration shown. The cage members can also be made of a plastic material. Also, a series of openings or windows 42 are provided in the cage member.

As shown in FIGS. 1–5, the cage member can be positioned as an inner cage member 26, that is, be positioned adjacent the inner race member 24. Also, as discussed below with respect to the alternate embodiment shown in FIG. 14, a cage member can also be positioned in a one-way clutch mechanism as an outer cage member, that is adjacent the outer race 22.

The spring member 28 is an energizing ring spring and is preferably positioned between the cage member 26 and the outer race member 22. The energizing spring 28 retains and spaces the sprags 25 peripherally between the races 22 and 24 and also biases the sprags 25 toward wedging engagement. The spring member 28 has an annular or ring-shape configuration, as shown in FIGS. 1–5. The spring member also has a series of openings or windows 40 uniformly spaced around its periphery for receiving the tiltable sprags 25.

The combination of cage member 26 and spring member 28 causes the sprags 25 to be fully phased in the annular space between the races. The same number of windows are provided on each of the cage and spring members and a sprag is positioned in each mating pair of windows.

Preferably, the energizing spring 28 is made from a flexible and stretchable material, that is a material which is capable of approximately 50% or more elongation without breaking or becoming permanently deformed. In this regard, preferred materials for the stretchable energizing ring spring are elastomeric materials and the preferred range of elongation is about 50% to 300%. Elastomer materials by definition recover their size and shape at room temperature after removal of a deforming force. In this regard, most plastic materials, such as thermal set and thermoplastic materials, would not be suitable for use with the present invention.

As indicated, the material used for the ring spring member in accordance with the present invention preferably is an elastomer, such as a cross-linked polymer with a failure strain level of 50–100% or higher. Elastomers and other materials of this type also have the ability to dampen vibration which results in a quieter clutch mechanism. Preferred elastomer materials for the spring member include fluoroelastomer, such as Viton, while other possible materials include polyacrylate and ethylene acrylate.

In order to keep the cost of materials in the clutch assembly to a minimum, it is preferred that the thickness T (as shown in FIG. 2) of the spring member 28 be kept to a minimum. The thickness T is less than 50% of the height H (as shown in FIG. 2)—and preferably about 20%—of the annular space between the inner and outer races 24 and 22. For example, in some known one-way clutch mechanisms, the annular space has a height H of about 8.3 mm. The preferred thickness T for the spring member 28 for such an annular space is about 1.5 mm (or about 18% of the height H).

Figure 13:
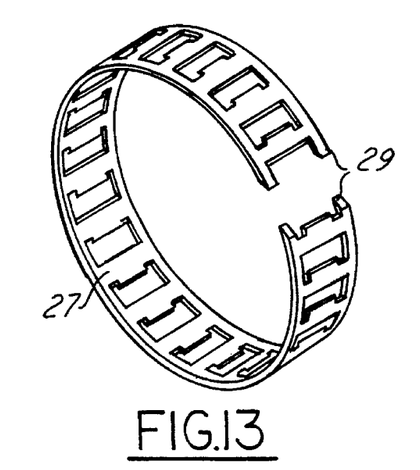
FIG. 13 illustrates a spring member formed from a flat ribbon.

The stretchable energizing ring spring 28 can be formed in any known or conventional method. For example, the spring members 28 could be injection molded or compression molded in the shape and configuration shown in FIGS. 1–5. These molding processes are commonly used for elastomeric materials. In addition, the spring member 27 could be formed as a flat ribbon and bonded or glued together, as shown in FIG. 13. In this regard, to increase the bonding strength of the connection between the ends of the ribbon, the ends 29 are preferably cut or formed at a mitered or 45°0 angle, as shown.

Figures 16, 17:
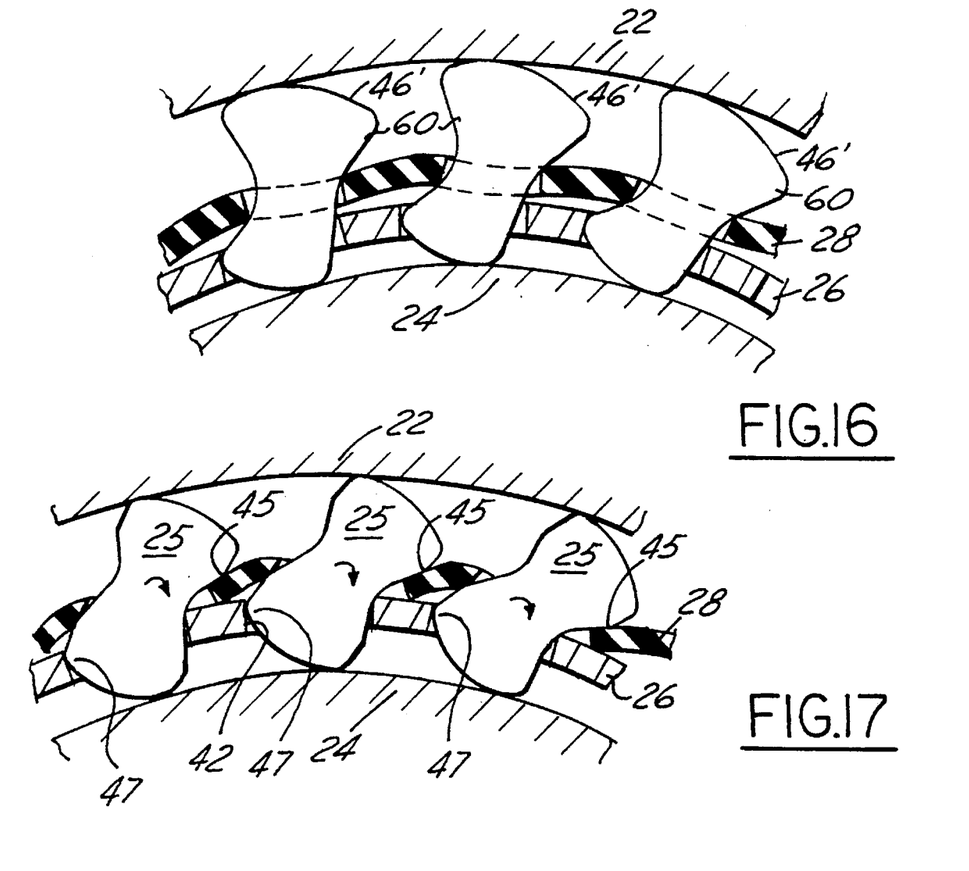
FIG. 16 illustrates an alternate embodiment of the invention in which the sprag members have enlarged wedging surfaces.
FIG. 17 illustrates an embodiment of the present invention which prevents the sprag members from rotating out of the cage.

As indicated above, the present invention can use conventional sprags. Any sprags that are energized by metal ribbon springs or the like and used in conventional one-way clutches can be used with the stretchable energizing ring spring 28 in accordance with the present invention. Also, since the present clutch mechanism only uses a single thin cage member and a single thin spring member, more room is left between the races for providing an enlarged wedging surface on the sprags. A sprag member of this type 60 is shown in FIG. 16. As shown, the sprag members 60 have an enlarged wedging surface 46' which provides a higher torque capacity for the clutch.

Figure 7:
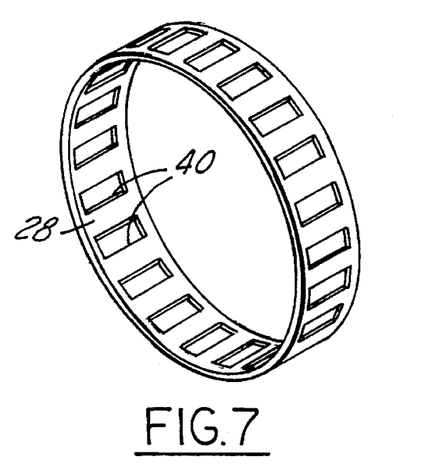
FIGS. 7–10 illustrate spring members in accordance with the present invention with various window structures.
Figure 8:
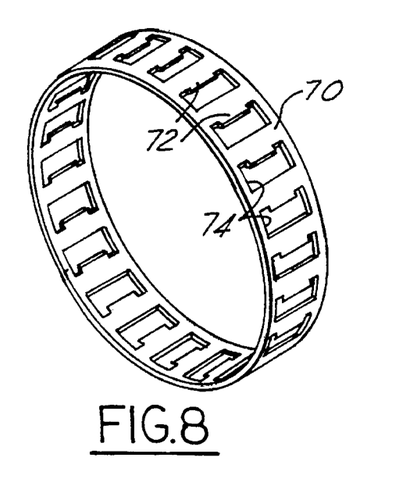

Preferably, the openings or windows 40 in the stretchable spring member 28 are rectangular in shape. This is shown in FIG. 7. Alternately, the windows on the spring member can have one or more energizing tabs which affect or control the magnitude of the energizing force created by the spring on the sprag members. For example, in FIG. 8, the energizing spring 70 has an energizing tab 72 in each of the windows 74. The length, width and thickness of the tabs 72 can be modified as desired to control the magnitude of the energizing force on the sprags.

Figure 9:
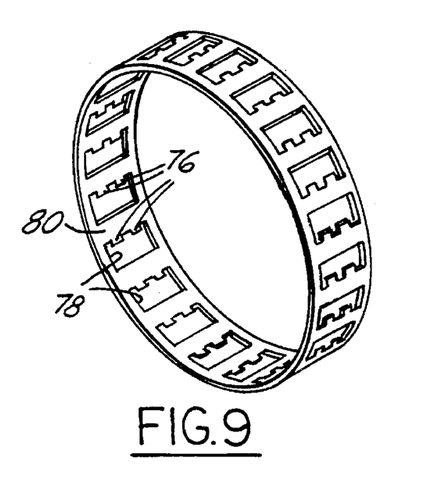
Figure 10:
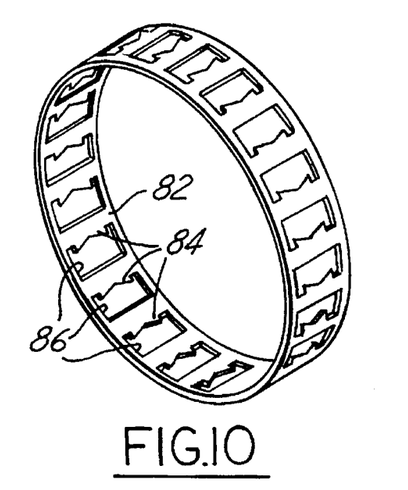

It is also possible to have multiple energizing tabs 76, as shown in FIG. 9. In the embodiment shown in FIG. 9, the ring spring member 80 has two tab members 76 in each of the windows 78. Further, as shown in FIG. 10, the spring member 82 can have a tab 84 of non-uniform shape in each of the windows 86.

It is understood that energizing tabs may be placed on either side of the sprag members or on both sides of the sprag members, as desired. The shape and number of tab members utilized, or whether tab members are to be utilized at all, depends upon the magnitude of the energizing force desired on the sprag members and the use of the clutch mechanism. Tabless openings or windows are preferred in accordance with the present invention since the area of the spring member between the sprag members is sufficient to provide the necessary flexibility and resiliency.

In many sprag clutch mechanisms, it is necessary that the sprags be held from rotation relative to one of the races. Such inertia control is typically used in high performance applications. For example, in many known automotive applications, the sprag members are held by friction to the outer races and rotate or do not rotate along with the outer race. For this purpose, an inertia or interference contact is provided between the outer cage and the outer race in order to provide the requisite frictional connection. The same function can be accomplished with the stretchable ring spring member 28 in accordance with the present invention. Embodiments for accomplishing this are shown in FIG. 11 and 12.

Figure 11:
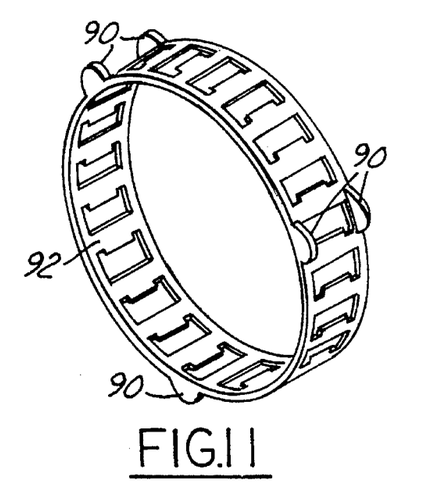
FIGS. 11–12 illustrate spring members in accordance with the present invention with inertia holding connections.

In FIG. 11, a plurality of radial bumps or projections 90 on spring member 92 cause interference between the spring member 92 and the outer race, providing a frictional connection. The radial projections 90 are preferably provided in pairs as shown and a plurality of pairs are provided at uniformly spaced positions around the circumference or periphery of the spring member.

Figure 12:
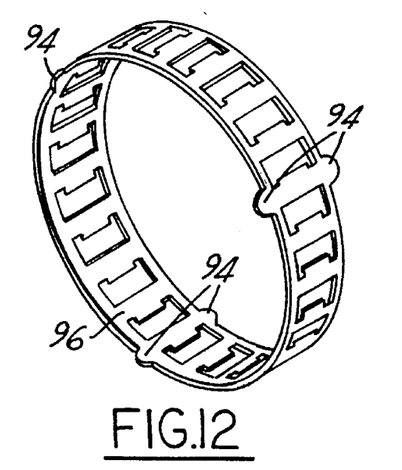

As shown in FIG. 12, axial or longitudinally arranged projections or bumps 94 on spring member 96 can be used to create a frictional connection with a sidewall or other member (not shown) of the clutch assembly or associated mechanism. The axial projections 94 are also preferably provided in pairs and spaced at uniform positions around the circumference of the spring members. The sidewalls which retain or contain the clutch mechanism in an axial manner, are often connected to the outer races, thus providing an equivalent frictional connection to the outer race.

The combination of the inner cage 26 and stretchable ring spring 28 provide phasing of the sprags 25 and can also limit their rotation. Limiting the rotation of the sprags is important because the sprags must be prevented from rotating out of the inner cage. During a "pop" of the sprags, the sprags rapidly lose load and rotate to a position such as a freewheeling position shown in FIG. 4.

There are two ways to limit the rotation of the sprag members. First, as shown in FIG. 4, the edge of the windows 42 on the inner cage 26 can be dimensioned to provide rotational limiting surfaces and limit the rotation of the sprags 25 in the direction of arrows 43.

Second, the stretchable ring spring 28 can be used in concert with the cage to limit the rotation of the sprags. As shown in FIG. 17, the spring member 28 is positioned sufficiently close radially to the inner cage member 26. Due to the structure and dimensions of the two members, as well as the sprag members, the spring member 28 forced radially downwardly by the sides 45 of sprag members 25, comes in contact with the inner cage 26 before the sprag members 25 can rotate out of the cage. If the sprag becomes tilted an undesired amount, the upper (radially outward) portion 45 of the sprags 25 contact the spring member 28 which in turn makes contact with the inner cage 26 at a point before the lower (radially inward) portions 47 of the sprags are able to be forced through the openings or windows 42 in the cage member.

The flexible, stretchable elastomeric spring member 28 also has a dampening effect on the impact of a "pop." This absorbs impact energy and protects the inner cage from damage. Also, the extra space afforded by the elimination of an outer or second cage between the race members allows radial placement of the inner cage slightly more radially outwardly. This allows a larger range of sprag rotation, also as shown in FIG. 17.

Figure 14:
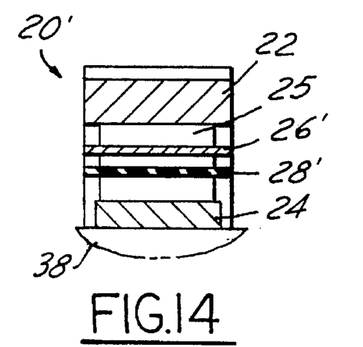
FIG. 14 illustrates an alternate embodiment of the present invention in which the spring member is positioned at a radial position inwardly of an outer cage member.

As mentioned above, it is also possible in accordance to the present invention to provide a one-way clutch mechanism 20' with a stretchable ring spring member 28', but wherein the cage member 26' is placed radially outwardly of the ring spring member. This alternate embodiment is shown in FIG. 14. This embodiment of the invention produces a high torque capacity with conventional sprags because the inner ends of the sprags can be placed closer together at the inner race. Also, sprags with a larger wedging surface at the inner race can be used to provide a higher torque capacity.

Figure 15:
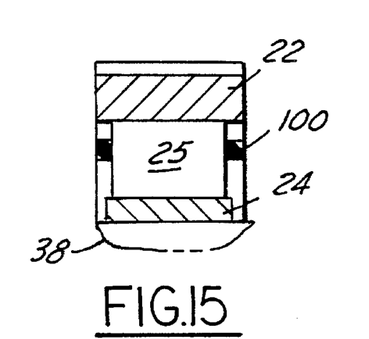
FIGS. 15 and 15A illustrate still another alternate embodiment of the present invention in which the spring member is used without any accompanying cage members.

Another embodiment of the present invention is shown in FIG. 15. This embodiment uses only a stretchable ring spring member 100 positioned between the inner and outer races 24 and 22, respectively. No cage members are utilized. This embodiment could be provided for low-cost applications in which the desired performance of the clutch mechanism is relatively low. For this embodiment, the spring member 100 is preferably made from the same material and has the same properties as the embodiments described above.

Also, the thickness of the spring member used in accordance with the present invention should be less than 50% of the longitudinal length of the sprag members, or less than 50% of the radial distance of the annular space between the inner and outer races (H in FIG. 2). In this regard, the thickness T of the spring member is also preferably 20% or less of the radial height H of the annular space. By providing the spring member of a thin or narrow thickness T, the spring design of the present invention uses less material than known clutches having annular elastomeric spring members.

Figure 15A:
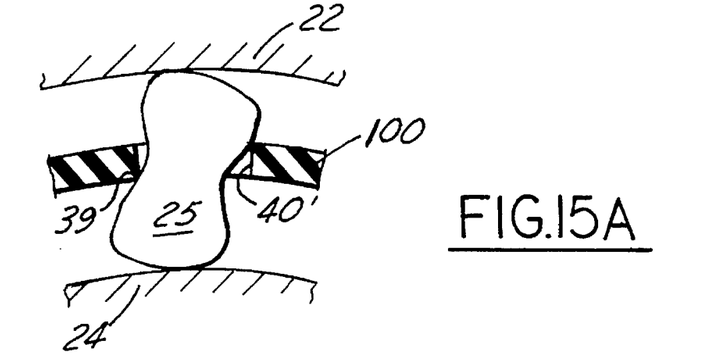

Also in the embodiment shown in FIG. 15, the spring member 100 is preferably a continuous one-piece molded spring member and has a plurality of uniformly spaced windows without energizing tabs or fingers (See FIG. 7). The circumferential dimension of the windows 40', however, in combination with the outer dimensions of the sprag members, should be such that at least one edge 39 of one of the sides of the windows 40' should be in constant contact with an outer surface of the sprag members. This is shown in FIG. 15A.

As indicated above, the present invention provides a single-cage one-way clutch mechanism which provides full phasing of the sprags yet is lower in cost and less expensive to manufacture and assemble than known double-cage clutch mechanisms. Also, elimination of the second cage allows the sprags to have larger wedging surfaces which increases the torque capacity of the clutch mechanism over that of double-cage sprag clutch mechanisms. The outer wedging surface of sprag members of some clutch designs known in the art are limited in width W (see FIG. 2) to fit inside rigid outer cage windows. The sprags of the present invention do not have this limitation.

The stretchable spring member also helps keep the sprags in full phase and, at the same time, provides a resilience and biasing force which helps prevent the sprags from "popping" and helps return any "popped" sprags to their normal positions. The spring member also absorbs the force caused by a "pop" and protects the metal single-cage member from deforming or becoming damaged. This makes the clutch mechanism more durable and extends its life.

In some ways, the annular ring spring member acts like an outer cage member, but does not have some of the drawbacks of a second cage member and also provides a clutch mechanism which is more advantageous than a traditional double-cage clutch mechanism. For example, the spring member is sufficiently rigid to perform phasing, but is less expensive than a separate metal outer cage member. Further, the use of an annular ring spring member eliminates the need for a ribbon spring or individual sprag springs or the like, which are used with double-cage clutch mechanisms. Elimination of a rigid second cage member also allows use of sprags with larger wedging surfaces at one end.

Preferably, the circumferential width of the openings or windows 40 in the spring member 28 are dimensioned such that they provide a slight interference fit with the outer side surfaces of the sprag members 25. The spring dimensioned in this way holds the sprags securely and also allows for any material relaxation over time.

The inner (or outer) cage member is preferably made from a metal material such as steel, but also could be made from a rigid plastic material or any other material that is sufficiently rigid to align the sprags axially. As indicated above, the resilient ring spring member provides an energizing force for the sprags and the combined action of the cage and ring spring provide full phasing of the sprags.

The resilience of the spring members in accordance with the present invention further provides dampening of the sprags during engagement. This decreases the noise and vibration of the clutch mechanism. Moreover, the fatigue life of the spring members in accordance with the present invention is longer than metal ribbon springs such as those used in double-cage clutch mechanisms due to the large allowable deformation before failure of the stretchable spring member material.

In addition, due to the durability and stretchability of the resilient spring material, the sprags, in accordance with the present invention, can be inserted into the cage and spring in an automated assembly process. Automated assembly of double-cage clutch mechanisms is difficult without damaging the springs.

The present invention is an improvement over all clutch mechanisms which utilize metal energizing springs. The sprag members, when transitioning from a freewheeling mode to an engaged mode, will for a short time (usually less than 0.001 seconds) skid before engagement. This skidding motion is characterized by high frequency vibration driven by the alternate slipping and sticking of the contacting surfaces and also due to the external vibration sources such as the drive chain. Loading of the sprags does not occur until the vibration is damped. The ring springs in accordance with the present invention which are made from a flexible, stretchable elastomeric material dampen the vibration leading to quicker and more uniform engagement for all of the sprag members.

While the best mode for carrying out the invention has been described in detail, those familiar with the art to which this invention relates will recognize various alternative designs and embodiments for practicing the invention as defined by the following claims.

What is claimed is:

1. A one-way clutch assembly comprising:
   a driving member and a driven member relatively rotatable in driving and overrunning direction with respect to each other;
   said driving member and said driven member disposed concentrically about an axis in spaced relation to each other defining an annular space therebetween;
   an annular rigid cage member positioned in said annular space and having a first plurality of spaced windows;
   an annular spring member positioned in said annular space and having a second plurality of spaced windows;
   said annular spring member being made from a thin stretchable elastomeric member; and
   a plurality of sprag members, each of said sprag members tiltably disposed in one of said first plurality of spaced windows and also in a respective one of said second plurality of spaced windows;
   said sprag members being hour-glass in shape and having a narrow waist portion, two larger engaging end portions, and angled surfaces joining said end portions and waist portion;
   said windows in said spring member each having a rectangular cross-sectional shape and each having a circumferential width dimension greater than the corresponding circumferential width of said sprag waist portion and less than the corresponding circumferential width of said sprag end portions;
   wherein said sprag members are held in position in the axial, circumferential and radial directions by said spring member and are fully phased in said annular space.

2. The one-way clutch assembly as defined in claim 1 wherein said rigid cage member is positioned radially inwardly of said spring member.

3. The one-way clutch assembly as defined in claim 1 wherein said rigid cage member is positioned radially outwardly of said spring member.

4. The one-way clutch assembly as defined in claim 1 wherein each of the windows in said second plurality of spaced windows have at least one energizing tab therein.

5. The one-way clutch assembly as defined in claim 1 wherein said spring member is made from a material which is stretchable at least 50%.

6. The one-way clutch assembly as defined in claim 1 wherein said spring member has a thickness of less than 50% of the radial height of said annular space.

7. The one-way clutch assembly as defined in claim 6 wherein the thickness of said spring member is about 20% of the radial height of said annular space.

8. The one-way clutch assembly as defined in claim 1 wherein one enlarged end portion of each of said sprag members is larger than the other end portion.

9. The one-way clutch assembly as defined in claim 8 wherein said enlarged wedging surfaces are on the radial outward ends of said sprag members.

10. The one-way clutch assembly as defined in claim 1 wherein said second plurality of spaced windows are dimensioned such that said sprag members are positioned in interference relationships therein.

11. The one-way clutch assembly as defined in claim 1 wherein said spring member is a one-piece molded member.

12. The one-way clutch assembly as defined in claim 1 wherein said spring member is made from a flat ribbon of material bonded together to form an annular ring.

13. The one-way clutch assembly as defined in claim 1 further comprising frictional interference projection means on said spring member.

14. The one-way clutch assembly as defined in claim 13 wherein said projection means extend in an axial direction.

15. The one-way clutch assembly as defined in claim 13 wherein said projection means extend in a radial direction.

16. The one-way clutch assembly as defined in claim 1 wherein said first plurality of spaced windows are dimensioned to limit the rotation of the sprag members.

17. The one-way clutch assembly as defined in claim 1 wherein said second plurality of spaced windows are dimensioned to assist in limiting the rotation of the sprag members.

18. The one-way clutch assembly as defined in claim 1 wherein said first plurality of spaced windows and said second plurality of spaced windows are respectively dimensioned to cooperate to limit the rotation of the sprag members.

19. A one-way clutch sub-assembly comprising:
   an annular rigid cage member having a first plurality of spaced windows;
   an annular spring member positioned concentric to said rigid cage member and having a second plurality of spaced windows;
   said annular spring member being made from a thin stretchable elastomeric member; and
   a plurality of hour-glass shaped sprag members, each of said sprag members tiltably disposed in one of said first plurality of spaced windows and also in a respective one of said second plurality of spaced windows;
   said sprag members having a constant cross-section and having two larger engaging end portions, a narrower waist portion and angled surfaces joining said engaging end portions and waist portion forming said hour-glass shape;
   said windows in said second plurality of spaced windows each having a uniform rectangular cross-sectional shape and each having a circumferential width dimension greater than the circumferential width of said waist portion and less than the circumferential width of said enlarged end portions;
   wherein said sprag members are held in fully phased position in both the axial and tangential directions by said spring member.

20. The one-way clutch sub-assembly as defined in claim 19 wherein said rigid cage member is positioned radially inwardly of said spring member.

21. The one-way clutch sub-assembly as defined in claim 19 wherein said rigid cage member is positioned radially outwardly of said spring member.

22. The one-way clutch sub-assembly as defined in claim 19 wherein each of the windows in said second plurality of spaced windows have at least one energizing tab therein.

23. The one-way clutch sub-assembly as defined in claim 19 wherein said spring member is made from a material which is stretchable at least 50%.

24. The one-way clutch sub-assembly as defined in claim 19 wherein said spring member has a thickness of substantially less than 50% of the radial height of said sprag members.

25. The one-way clutch sub-assembly as defined in claim 19 wherein the thickness of said spring member is about 20% of the radial height of said sprag members.

26. The one-way clutch sub-assembly as defined in claim 19 wherein one enlarged end of each of said sprag members is larger than the other end portion.

27. The one-way clutch sub-assembly as defined in claim 19 wherein said enlarged wedging surfaces are on the radial outer ends of said sprag members.

28. The one-way clutch sub-assembly as defined in claim 19 wherein said second plurality of spaced windows are dimensioned such that said sprag members are positioned in interference relationships therein.

29. The one-way clutch sub-assembly as defined in claim 19 wherein said spring member is a one-piece molded member.

30. The one-way clutch assembly as defined in claim 19 wherein said spring member is made from a flat ribbon of material bonded together to form an annular ring.

31. The one-way clutch assembly as defined in claim 19 further comprising frictional interference projection means on said spring member.

32. The one-way clutch assembly as defined in claim 31 wherein said projection means extend in an axial direction.

33. The one-way clutch assembly as defined in claim 31 wherein said projection means extend in a radial direction.

34. The one-way clutch assembly as defined in claim 19 wherein said first plurality of spaced windows are dimensioned to limit the rotation of the sprag members.

35. The one-way clutch assembly as defined in claim 19 wherein said second plurality of spaced windows are dimensioned to assist in limiting the rotation of the sprag members.

36. The one-way clutch assembly as defined in claim 19 wherein said first plurality of spaced windows and said second plurality of spaced windows are respectively dimensioned to cooperate to limit the rotation of the sprag members.

37. The one-way clutch assembly as defined in claim 19 wherein said spring members can be elongated within the range of about 50% to 300%.

* * * * *